Feb. 13, 1962 B. I. ULINSKI 3,021,150
STEERING MECHANISM FOR INDUSTRIAL TRUCK
Filed Oct. 16, 1958 3 Sheets-Sheet 1

INVENTOR.
BRONISLAUS I. ULINSKI
BY
*H. Golden*
ATTORNEY

Feb. 13, 1962 B. I. ULINSKI 3,021,150
STEERING MECHANISM FOR INDUSTRIAL TRUCK
Filed Oct. 16, 1958 3 Sheets-Sheet 2

INVENTOR.
BRONISLAUS I. ULINSKI
BY
A.H.Golden
ATTORNEY

Feb. 13, 1962  B. I. ULINSKI  3,021,150
STEERING MECHANISM FOR INDUSTRIAL TRUCK
Filed Oct. 16, 1958  3 Sheets-Sheet 3

INVENTOR.
BRONISLAUS I. ULINSKI
BY
ATTORNEY

United States Patent Office 3,021,150
Patented Feb. 13, 1962

3,021,150
STEERING MECHANISM FOR INDUSTRIAL TRUCK
Bronislaus I. Ulinski, Flossmoor, Ill., assignor to The Yale and Towne Manufacturing Company, Stamford, Conn., a corporation of Connecticut
Filed Oct. 16, 1958, Ser. No. 767,696
1 Claim. (Cl. 280—87)

This invention relates to industrial trucks, and, more particularly, to a steering mechanism for industrial trucks of the class in which the rear wheels of the truck are steered wheels, while the manually actuated steering wheel is at the forward end of the truck.

In trucks of this class it is important that the steered wheels be capable of steering movement through a wide angle. Also, in view of the heavy loads carried by trucks of this class, it is essential that the steering mechanism be so arranged that it will operate effectively despite the heavy loads and without strain of the mechanism. This last requirement is particularly important where the steered wheels are at one end of the truck and must be actuated by mechanism that is in turn operated at the other end of the truck. My invention contributes a novel steering mechanism that is related to the truck chassis in a manner to render the mechanism capable of transmitting steering motion without strain, despite the distance between the steered wheels and the steering wheel, and despite the heavy loads on the truck. All this results because of the particular mounting of the main power transmitting members of my steering mechanism on the truck.

As a particular feature of my invention, I provide a bearing member, preferably in the form of a sleeve, fixed to the main frame of the truck, this member serving as a bearing for a steering shaft that protrudes rearwardly of the member for connection to the rear wheels. In my preferred construction, the frame is formed of bars that are bent to provide steering room, and the bearing member passes through one of these bars and is actually integral with the bar.

As another feature of my invention, I provide a rotatable bar connected at one end to a conventional steering post or rod, and connected universally through a fixed angle at the other end to the forward end of the steering shaft that is carried by the bearing member. Since the angle is fixed through which the bar and shaft are connected, I am able to maintain a fixed output to the shaft for a given torque applied to the hand wheel. Those persons skilled in the art will appreciate the value of such a construction over the conventional arrangement wherein the rotatable bar is universally connected to a member that moves bodily relatively to the frame due to variations in the road surface, thereby varying the connecting angle and the output of the steering mechanism accordingly.

As still another feature of my invention, I employ a pitman arm or lever at the rear end of the steering shaft rather than at the base of the steering post or rod, as is the frequent practice. In this manner, I reduce the pitman arm arc required to pivot the steered wheels a given amount. Since my pitman arm is connected to a substantially transverse link, it will be seen that by reducing the arc of movement of the pitman arm, I am able to obtain more uniform movement of the link. Also, by locating the pitman to the rear end of the steering shaft where the shaft protrudes from the mounting sleeve, I take full advantage of the rigidity of mounting of the shaft in the manner described.

A still further feature of my invention resides in the disposition of a drag link. The link is connected at one end to an end of the pitman arm and at the other end to the steered wheels for movement by the pitman arm in a direction transversely of the truck for steering the wheels. More particularly, the drag link extends between the pitman and a tie rod that in turn is connected to each of the steered wheels at points offset from the axes about which the wheels pivot. Arcuate movement of the pitman arm by the steering shaft moves the drag link transversely of the truck with substantially no movement longitudinally of the truck, thus representing a further contribution to the rigidity of the steering mechanism as well as to the overall compactness of the truck.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

A specific embodiment of the invention has been chosen for purposes of illustration and description and is illustrated in the accompanying drawings.

Figure 1:
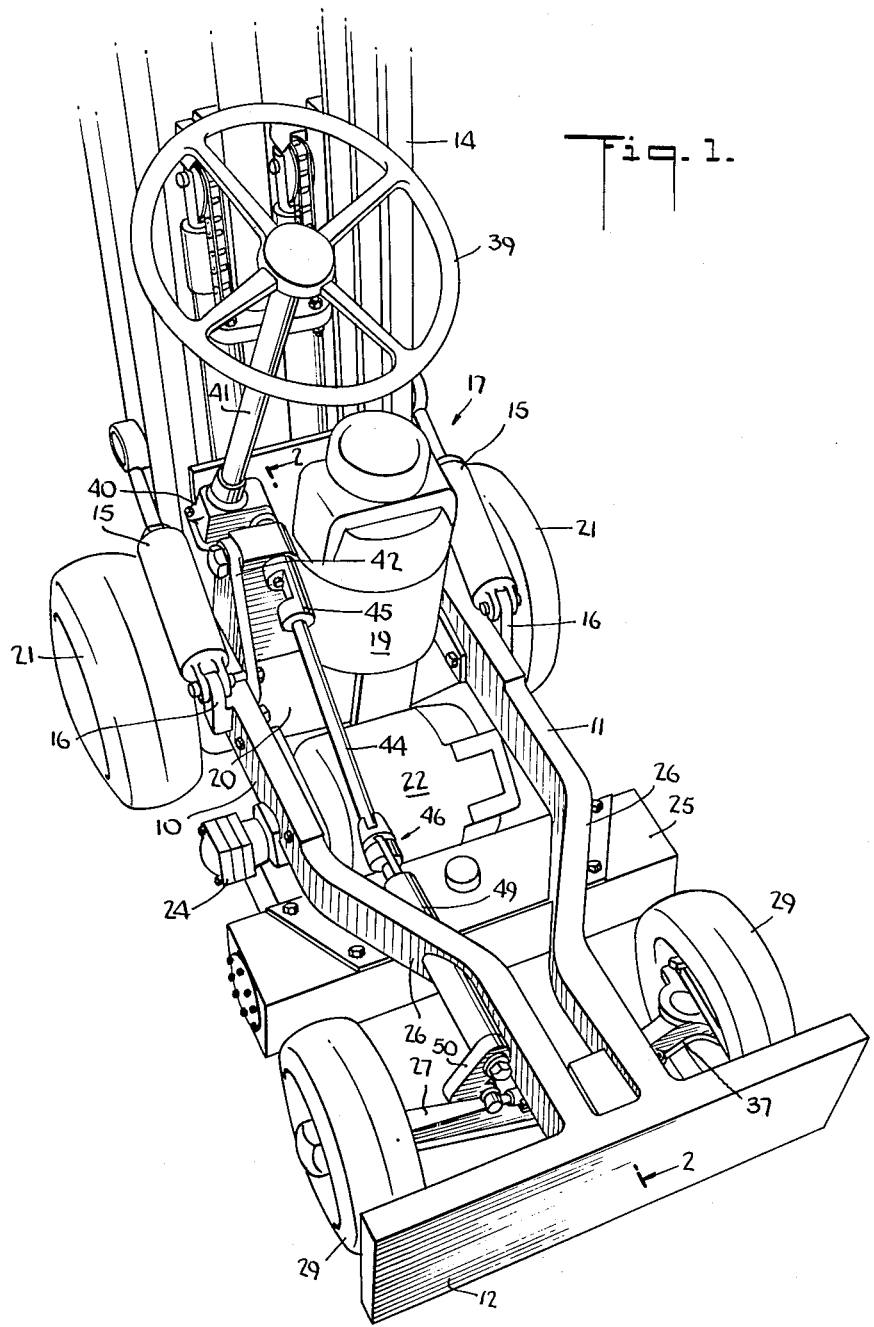
FIG. 1 is a perspective view of a truck frame illustrating my novel steering mechanism.
Figure 2:
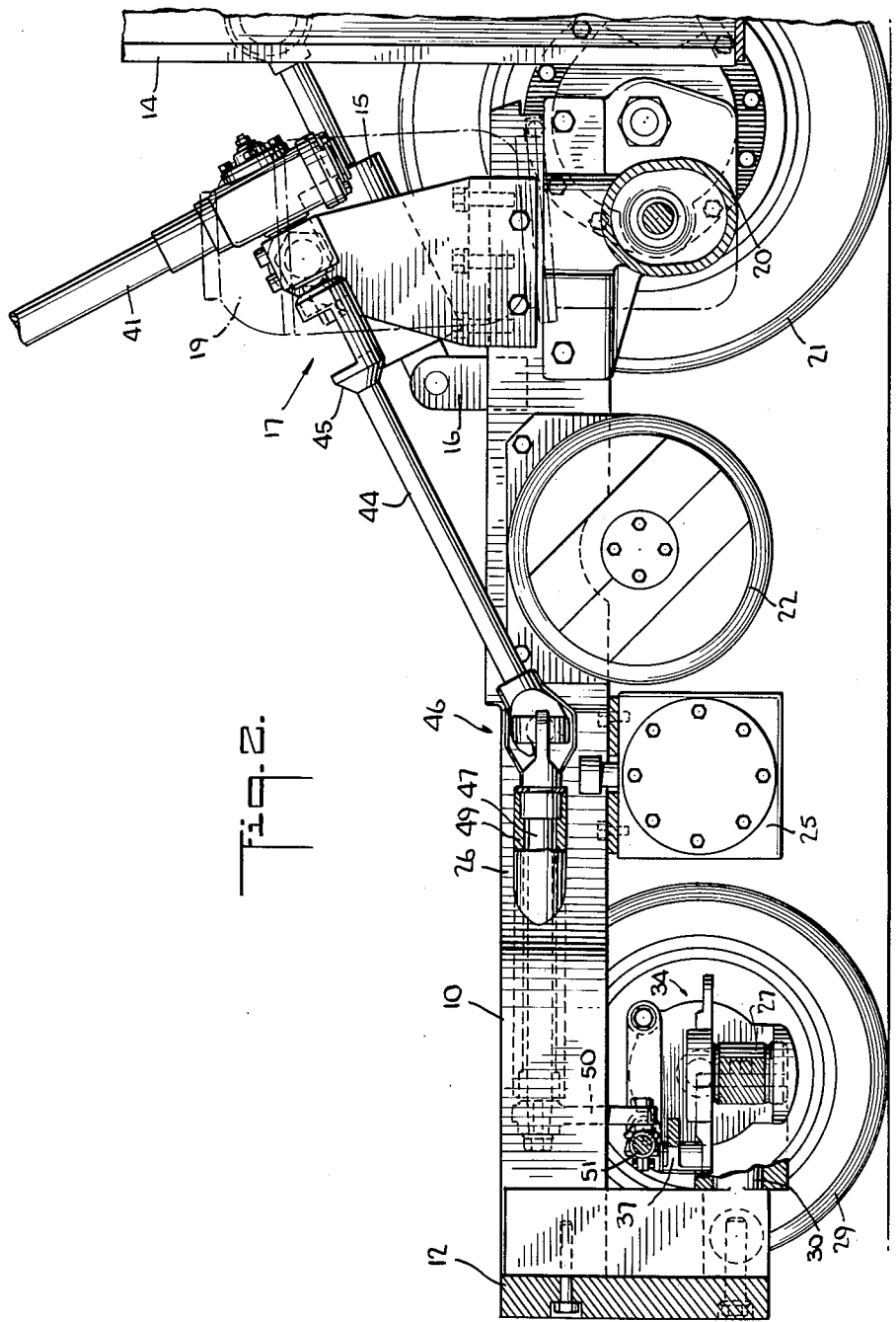
FIG. 2 is a cross sectional view, taken along the lines 2—2 of FIG. 1.

Referring now to the drawings, and more particularly to FIGS. 1 and 2 thereof, there is shown a truck frame comprising a pair of spaced, longitudinal side bars 10 and 11 and a transverse end plate 12 fixed to the rear ends of the side bars. Uprights 14 may be supported in a conventional manner at the front end of the truck for tilting movement by a pair of tilt rams 15 connected to the side bars by brackets 16.

A driving and traction unit 17 is supported at the forward end of the frame and includes a drive motor 19, a front axle 20 and front wheels 21. To provide power for operating the rams 15 and other hydraulically controlled accessories, the side bars 10 and 11 also support a second motor 22 arranged to drive a fluid pump 24, and also support a fluid reservoir 25.

Before proceeding further with the description, I shall draw attention to the fact that, as shown in FIG. 1, the side bars 10 and 11 are parallel at their forward portions but are bent at a point along their length so that each bar converges towards the other in a rearward direction along a part of its length 26. The bars then bend again so that the rear portions are parallel but relatively closely spaced.

Figure 3:
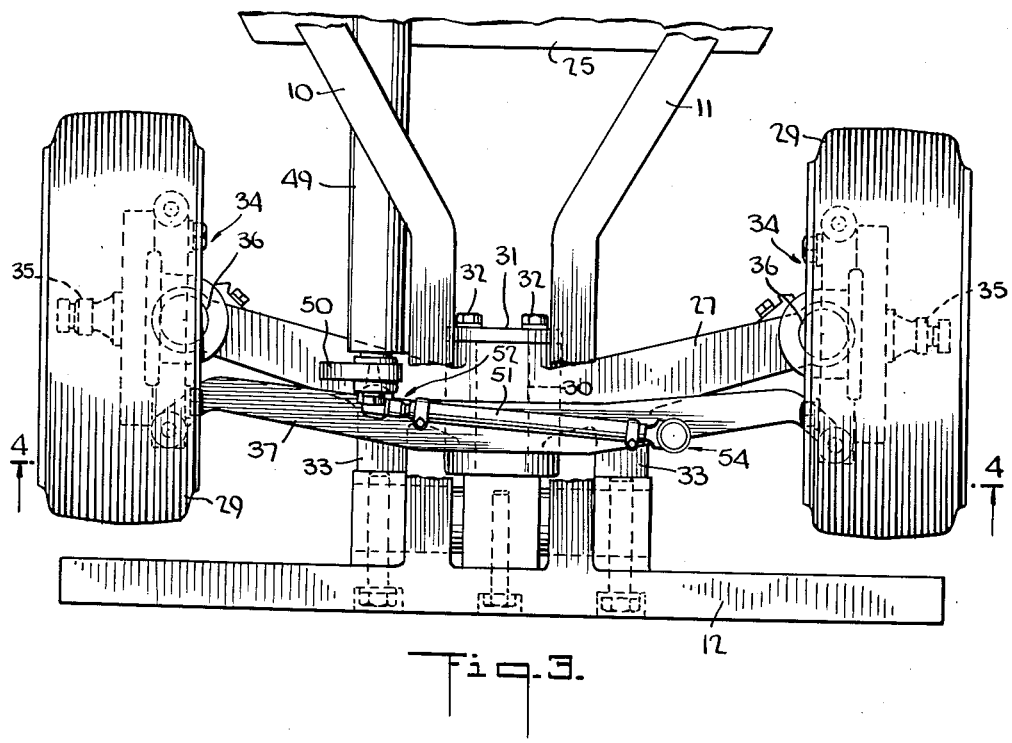
FIG. 3 is a partial top view of the truck frame, broken away to illustrate certain parts of my steering machanism.
Figure 4:
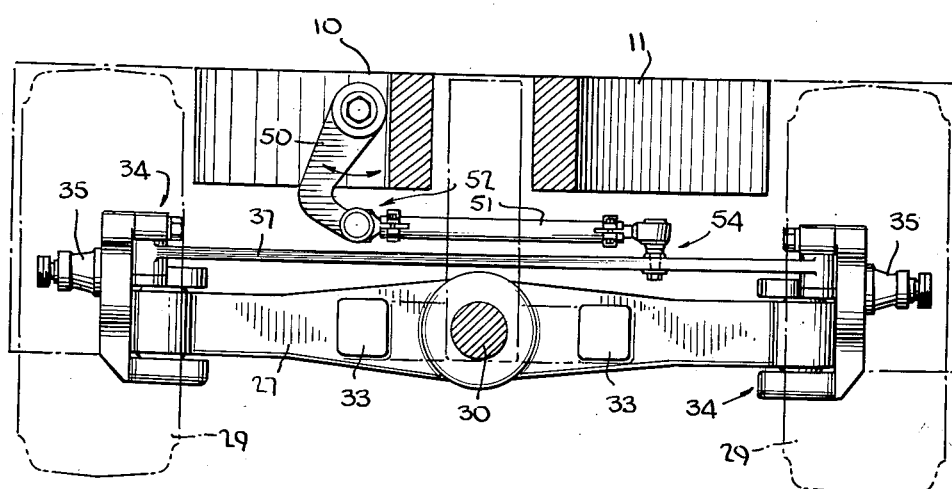
FIG. 4 is a sectional view taken along the line 4—4 of FIG. 3.

I provide my truck with a rear axle 27 to the ends of which I mount rear steered wheels 29. To mount the axle on the truck frame, a pivot 30 is welded to the end plate 12 in the longitudinal axis of the truck, as shown in FIGS. 3 and 4. The axle 27 is formed with a bearing to enable it to rock upon the pivot 30 when the rear wheels 29 move over irregular ground. The axle 27 is retained on the pivot 30 by an end plate 31 secured to the pivot by screws 32. The axle is also formed with a pair of lugs 33 that provide bearing surfaces in contact with the end plate 12 at points laterally spaced from the pivot 30 so as to accept forces that occur when the wheels 29 strike an obstruction, thereby minimizing bending stresses on the pivot 30.

The wheels 29 may be mounted for steering movement on the axle 27 in any suitable manner, and may conveniently utilize the novel mounting arrangement taught in my Letters Patent No. 2,829,903, dated April 8, 1958, and entitled "Steering System for Industrial Truck." In this construction, I utilize duplicate mounting members 34 formed with stub shafts 35 for rotatably mounting the wheels 29 and also formed to mount axle king pins 36, and a tie rod 37.

I shall now describe my novel steering mechanism as applied to a truck frame of the type that has already been discussed.

I provide a hand steering wheel 39 connected to a conventional steering unit 40 by a steering post 41. The steering unit 40 is supported on the truck frame by a bracket 42 and imparts rotary motion to a bar 44 that is connected to the steering unit through an adapter 45. The bar 44 is universally jointed as at 46 to a shaft 47 that extends longitudinally of the truck. In order to obtain maximum rigidity for my steering mechanism, I place the shaft 47 in the plane of the frame bars 10 and 11 and I provide bearing means such as the bearing sleeve 49 that supports the shaft 47 for rotation by the bar 44 on a constant axis. This sleeve is fixed to the frame bar 10 and, as shown in FIGS. 1 and 3, actually passes through the bar at its converging part 26 so that parts of the sleeve are disposed on each side of the bar, the rear portion of the sleeve terminating in substantial alignment with the steered wheels.

The shaft 47 protrudes from the rear end of the sleeve 49 and is connected to one end of the pitman arm 50. The other end of the pitman arm is connected to one end of a link 51 by a universal joint 52, the link extending across the longitudinal axis of the truck and having its opposed end connected by a universal joint 54 to the tie rod 37 at a point between the longitudinal truck axis and an end of the tie rod, as shown in FIGS. 3 and 4.

In operation, rotation of the hand steering wheel 39 and steering post 41 is translated by the steering unit 40 into rotation of the bar 44 and through the universal joint 46, into rotation of the shaft 47. It will be seen that rotation of this shaft rocks the pitman arm 50 in one direction or the other, as indicated by the arrows in FIG. 4, depending upon the direction of rotation of the hand wheel. Rocking movement of the pitman arm causes the link 51 to move laterally relatively to the frame and to shift the tie rod 37 with it. Since, as shown in FIGS. 2 and 3, the tie rod is pivotally connected to the mounting members in rearwardly offset relation to the vertical axes of the king pins 36, it will be obvious that shifting movement of the tie rod by the link 51 causes the wheels 29 to pivot about the king pin axes.

From the foregoing description, it will be seen that I contribute by my invention a steering mechanism for industrial trucks capable of carrying heavy loads in which mechanism the steering wheels are easily steered through a wide angle while the steering mechanism itself is rigidly supported by the truck frame. It will also be seen that in my novel arrangement, the rotating bar and the shaft 47 are universally jointed at a fixed angle to assure fixed output to the shaft for a given torque applied to the hand wheel. I also locate the pitman arm at the rear of the shaft to obtain a reduced arc of movement of the pitman arm to pivot the steered wheels a given amount. My link 51, unlike the usual drag link, moves transversely of the truck with substantially no movement longitudinally of the truck, thus contributing further to the rigidiy of the steering mechanism, as well as to the overall compactness of the truck.

I believe that the construction and operation of my novel steering mechanism will now be understood, and that the advantages of my invention will be fully appreciated by those persons skilled in the art.

I now claim:

In a truck of the class described, a main frame comprising a pair of longitudinal complementary bars widely spaced for part of their length running from the front end and then bent toward one another and narrowly spaced at the rear end, a traction unit mounted at the forward end of said main frame and comprising opposed traction wheels, a pair of steered wheels mounted for steering movement at the rear end of said main frame, a steering rod mounted at the forward end of said main frame adjacent said traction unit and having a manually operated steering wheel at its upper end, a bearing sleeve fixed to said main frame with a portion thereof outside the frame at its narrowed portion and the remainder inside the frame at said bent portion, said sleeve terminating at its rear in substantial alignment with the steered wheels, a shaft mounted in said bearing sleeve and protruding at said rear end of the bearing sleeve, a lever fixed to said protruding end of the shaft for movement therewith, a link connected to said lever and to said steered wheels for movement by said lever in a direction transversely of said truck for steering said steering wheels, and means for driving said shaft including a rotating bar connected at one end to the steering rod and connected universally through a fixed angle at the other end to the forward end of said shaft for rotating said shaft.

References Cited in the file of this patent

UNITED STATES PATENTS

| | | |
|---|---|---|
| 1,211,949 | Lloyd | Jan. 9, 1917 |
| 1,238,732 | Andrews | Sept. 4, 1917 |
| 1,261,584 | Mayer et al. | Apr. 2, 1918 |
| 2,233,318 | Lewis et al. | Feb. 25, 1941 |
| 2,251,584 | Fageol et al. | Aug. 5, 1941 |
| 2,271,505 | Kolbe | Jan. 27, 1942 |
| 2,375,670 | MacPherson | May 8, 1945 |
| 2,429,302 | Abbe | Oct. 21, 1947 |
| 2,659,613 | Oberholtz et al. | Nov. 17, 1953 |
| 2,666,491 | Johnson | Jan. 19, 1954 |